(12) United States Patent
Mueller et al.

(10) Patent No.: US 11,792,253 B2
(45) Date of Patent: *Oct. 17, 2023

(54) BANDWIDTH ADAPTATION FOR DYNAMIC ADAPTIVE TRANSFERRING OF MULTIMEDIA

(71) Applicant: Dolby Laboratories Licensing Corporation, San Francisco, CA (US)

(72) Inventors: Christopher Mueller, Villach (AT); Yuwen He, San Diego, CA (US); James Crenshaw, Burbank, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 353 days.

This patent is subject to a terminal disclaimer.

(21) Appl. No.: 16/551,561

(22) Filed: Aug. 26, 2019

(65) Prior Publication Data
US 2019/0379718 A1    Dec. 12, 2019

Related U.S. Application Data

(63) Continuation of application No. 14/359,859, filed as application No. PCT/US2012/068990 on Dec. 11, 2012, now Pat. No. 10,397,294.

(60) Provisional application No. 61/576,334, filed on Dec. 15, 2011.

(51) Int. Cl.
| | |
|---|---|
| *H04L 47/10* | (2022.01) |
| *H04L 65/75* | (2022.01) |
| *H04L 65/80* | (2022.01) |
| *H04L 67/02* | (2022.01) |
| *H04L 65/61* | (2022.01) |
| *H04L 47/30* | (2022.01) |

(52) U.S. Cl.
CPC ............ *H04L 65/762* (2022.05); *H04L 47/10* (2013.01); *H04L 65/61* (2022.05); *H04L 65/80* (2013.01); *H04L 67/02* (2013.01); *H04L 47/30* (2013.01)

(58) Field of Classification Search
CPC ......... H04L 47/10; H04L 47/30; H04L 65/80; H04L 65/602; H04L 65/4069; H04L 67/02; H04N 19/164
USPC ...................................................... 709/217
See application file for complete search history.

(56) References Cited

U.S. PATENT DOCUMENTS

| | | |
|---|---|---|
| 6,185,625 B1 | 2/2001 | Tso |
| 7,548,948 B2 | 6/2009 | Klemets |
| 9,015,335 B1 | 4/2015 | Gigliotti |
| 2002/0146069 A1 | 10/2002 | Olsen |
| 2003/0055995 A1 | 3/2003 | Ala-Honkola |
| 2004/0003101 A1 | 1/2004 | Roth |
| 2005/0163059 A1 | 7/2005 | Dacosta |
| 2005/0249226 A1 | 11/2005 | Kang |

(Continued)

FOREIGN PATENT DOCUMENTS

WO    2011139305    11/2011

OTHER PUBLICATIONS

Anonymous: "Information Technology—Dynamic Adaptive Streaming Over HTTP (DASH)—Part 1, Media Presentation Description and Segment Formats", ISO/IEC DIS 23009-1, Aug. 2011 (Year: 2011).*

(Continued)

*Primary Examiner* — Sibte H Bukhari

(57) ABSTRACT

Bandwidth adaptation is achieved with selection of quality levels of media content to be transferred based on network conditions.

12 Claims, 5 Drawing Sheets

(56) References Cited

U.S. PATENT DOCUMENTS

| | | | |
|---|---|---|---|
| 2007/0276954 | A1 | 11/2007 | Chan |
| 2008/0052414 | A1* | 2/2008 | Panigrahi ......... H04N 21/64769 709/246 |
| 2008/0109865 | A1 | 5/2008 | Su |
| 2010/0080163 | A1 | 4/2010 | Krishnamoorthi |
| 2010/0131671 | A1 | 5/2010 | Kohli |
| 2010/0235472 | A1* | 9/2010 | Sood ...................... H04L 67/06 709/224 |
| 2010/0268836 | A1 | 10/2010 | Jabri |
| 2011/0082924 | A1* | 4/2011 | Gopalakrishnan .......................... H04L 67/5651 709/231 |
| 2011/0096828 | A1 | 4/2011 | Chen |
| 2011/0173345 | A1 | 7/2011 | Knox |
| 2011/0238789 | A1* | 9/2011 | Luby .............. H04N 21/440227 709/219 |
| 2011/0270913 | A1* | 11/2011 | Jarnikov ................. H04L 65/80 709/203 |
| 2012/0042090 | A1* | 2/2012 | Chen .................... H04L 65/752 709/231 |
| 2012/0084454 | A1 | 4/2012 | Lindquist |
| 2013/0097309 | A1* | 4/2013 | Ma ...................... H04L 67/2847 709/224 |
| 2013/0103849 | A1 | 4/2013 | Gillies |

OTHER PUBLICATIONS

3GPP TS 26.234, "Transparent end-to-end packet switched streaming service (PSS)", Protocols and codecs, 2010.

Adobe HTTP Dynamic Streaming http://www adobe com/products/httpdynamicstreaming/ (last access: Oct. 2011).

Anonymous Information Technology—Dynamic Adaptive Streaming Over HTTP, (DASH)—Part 1: Media Presentation description and segment formats, ISO/IEC JTC 1/SC 29, Aug. 30, 2011.

Cisco White Paper: Cisco Visual Networking Index: Global Mobile Data Traffic Forecast Update, 2009-2014.

Evensen, K. et al. "Improving the Performance of Quality-Adaptive Video Streaming over Multiple Heterogeneous Access Networks", ACM Multimedia Systems, San Jose, CA, USA, Feb. 2011.

ISO/IEC JTC1/SC29/WG11, "Text of ISO/IEC 14496-10:200X/FDAM 1 Multiview Video Coding", Doc. N9978, Hannover, Germany, Jul. 2008.

Kuschnig, R. et al. "An Evaluation of TCP-based Rate-Control Algorithms for Adaptive Internet Streaming of H.264/SVC", ACM Multimedia Systems, Scottsdale, AZ, USA, Feb. 2010.

Kuschnig, R. et al. "Evaluation of HTTP-based Request-Response Streams for Interent Video Streaming", ACM Multimedia Systems, San Jose, CA, USA, Feb. 2011.

Liu, C. et al. "Rate Adaptation for Adaptive HTTP Streaming", ACM Multimedia Systems, San Jose, CA, USA, Feb. 2011.

Lohmar, T. et al. "Dynamic Adaptive HTTP Streaming of Live Content", IEEE International Symposium on a World of Wireless, Mobile and Multimedia Networks, Jun. 2011.

Microsoft Smooth Streaming: http://www.iis.net/download/smoothstreaming (last access: Oct. 2011).

Mueller, C. et al. "A VLC Media Player Plugin enabling Dynamic Adaptive Streaming over HTTP", ACM Multimedia, Scottsdale, AZ, Nov. 2011.

Muller, C. et al. "A Test-Bed for the Dynamic Adaptive Streaming over HTTP featuring Session Mobility", ACM Multimedia Systems, San Jose, California, USA, Feb. 2011, pp. 271-276.

Piamrat, K. et al. "Q-DRAM: QoE-Based Dynamic Rate Adaptation Mechanism for Multicast in Wireless Networks", Global Telecommunications Conference, IEEE, Piscatawa, NJ, USA, Nov. 30, 2009, pp. 1-6.

R. Pantos, W. May, "HTTP Live Streaming", IETF draft, Sep. 2011, http://tools.ietf.org/html/draft-pantos-http-live-streaming-07 (last access: Oct. 2011).

Sanchez, Y. et al. "iDASH: Improved Dynamic Adaptive Streaming over HTTP using Scalable Video Coding", ACM Multimedia Systems, San Jose, CA, USA, Feb. 2011.

Schwarz, H. et al. "Overview of the scalable video coding extension of the H.264/AVC standard", IEEE Transactions on Circuits and Systems for Video Technology, vol. 17, No. 9, Sep. 2007, pp. 1103-1120.

Stochhammer, T. "Dynamic Adaptive Streaming over HTTP—Standards and Design Principles", ACM Multimedia System conference, Feb. 23-25, 2011, San Jose, California, USA.

Timmerer, C. et al. "HTTP Streaming of MPEG Media", Proceedings of the Streaming Day 2010, Udine, Italy, Sep. 2010.

Wang, B. et al. "Multimedia Streaming via TCP: An Analytic Performance Study", ACM Transactions on Multimedia Computing, Communications and Applications, vol. 4, No. 2, May 2008, pp. 16:1-16:22.

* cited by examiner

BANDWIDTH ADAPTATION FOR DYNAMIC ADAPTIVE TRANSFERRING OF MULTIMEDIA

CROSS-REFERENCE TO RELATED APPLICATIONS

This application claims benefit as a Continuation of U.S. patent application Ser. No. 14/359,859, filed May 21, 2014, now U.S. Pat. No. 10,397,294, issued on Aug. 27, 2019, which claims benefit as a National Stage Entry (371) of International Application No. PCT/US2012/068990, filed Dec. 11, 2012, which claims the benefit, under 35 U.S.C. 119(e), of prior provisional application 61/576,334, filed on Dec. 15, 2011. The above-mentioned patent applications are assigned to the assignee of the present application and are hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to delivering media content over the Internet. More particularly, an embodiment of the present invention relates to bandwidth adaptation for dynamic adaptive transferring of multimedia.

BACKGROUND

With the modern internet, hypertext transfer protocol (HTTP) based media transferring is practically ubiquitous. Content providers typically deploy their media delivery service on top of the internet infrastructure. For example, content providers like Netflix do not deploy their own streaming architecture and can use the internet infrastructure as is. With the internees infrastructure of caches, content distribution networks (CDN) and proxies, HTTP was designed for best effort file delivery, rather than real time media delivery. Conventional streaming protocols such as real time transport protocol (RTP) do not typically exploit this infrastructure, which, unlike HTTP, may also be constrained by Network Address Translation (NAT) complexities and firewall traversal requirements.

Being stateful (server keeps track of which segments have already been downloaded), RTP performs a push function where a server drives file transfers. In RTP, a server must track status of a client device in order to send data at correct times. In contrast, being stateless (server does not track which segments have already been downloaded), HTTP performs a pulling function where a client device drives file transfers by requesting segments as needed. In HTTP a client device sends a request to a server, upon receipt of which the server sends data, obviating need for the server to track client device status. This allows an HTTP transferring server to remain unaware of sessions, which reduces the load on the server and provides ease of content distribution. Dynamic handling of fluctuating bandwidth can be difficult in RTP streaming without SVC or another scalable codec (see reference [5], incorporated by reference herein in its entirety). However, HTTP multimedia transferring adds a significant overhead to a transferring session compared to RTP (see reference [6], incorporated by reference herein in its entirety).

Moreover, conventional HTTP approaches do not actually represent real streaming. Instead, conventional HTTP "streaming" comprises progressive downloading, i.e., downloading, combined with immediate playback. While simple and deployable, progressive HTTP downloading does not manage fluctuating bandwidth issues well. Dynamic Adaptive Streaming over HTTP (DASH) was developed to address bandwidth fluctuation in progressive downloading.

DASH allows HTTP to bypass firewalls and NAT and its dynamic function handle varying bitrates. Essentially, DASH cuts media content into independently decodable segments. This allows encoding the media content at different qualities or resolutions, while dividing the media content into segments of equal length. Client devices use HTTP to access the media content and select the segments that most effectively fulfill client devices' new bandwidth or resolution demands. DASH typically uses a manifest file (MF) that provides a description of the media content and can be, for instance, extensible markup language (XML) based. On request from a client device to a server, the manifest file can be provided from the server to the client device to initiate a session. The client device can parse the manifest file and request individual media content segments according to information found in the manifest file.

DASH system adaptation method (also referred to as adaptation logic) is generally located at the client side, which leverages client devices' awareness of their capabilities and bandwidth requirements. It can be assumed that DASH may become widely deployed over the internet and mobile networks in the next few years. Mobile networks are proliferating rapidly, and video transferring is expected to comprise most traffic thereon over the next few years. However, neither HTTP nor the proxies that the protocol exploits to cache previously selected content (for bandwidth and cost conservation) are designed optimally for real time streaming.

It may be assumed that virtually every HTTP connection uses a proxy that is somewhere in the network, where a proxy is a network element that can store content that has been previously selected by other users connected to the internet through this proxy. For a DASH session, content is thus distributed not simply by content providers on the CDN network, but is also distributed in the network through the proxies. Distribution through the proxies is uncontrollable by the content providers because it depends on the client devices. For instance, distribution through the proxies may be significantly influenced by a client device's network location and capabilities. Most proxies thus cache only parts of the content (e.g., segments of media content of a certain bitrate, resolution, language classifications, or other characteristics by which they are cached).

Conventional DASH adaptation methods do not take this fact into account. As mobile networks and video transferring traffic thereon proliferate, this can impede optimum performance.

FIG. 1 depicts a basic representation of a DASH protocol where MF refers to a manifest file, DF refers to delivery format, ISOBMFF refers to a file format, and M2TS refers to a transport stream.

Proprietary solutions from various companies currently deployed in this area of technology include Microsoft's Smooth Streaming (see reference [8], incorporated by reference herein in its entirety), Adobe's Dynamic HTTP Streaming (see reference [9], incorporated by reference herein in its entirety), and Apple's HTTP Live Streaming (see reference [10], incorporated by reference herein in its entirety). Also other consortia such as ISO/IEC MPEG (see reference [2], incorporated by reference herein in its entirety) or 3GPP (see reference [7], incorporated by reference herein in its entirety) are currently trying to standardize this technology.

Each of these systems can follow nearly the same architecture as depicted in FIG. 1 and can utilize some kind of manifest file (MF). The manifest file can provide a description of media content adapted to be transferred and is generally XML (extensible markup language) based. On request, the manifest file can be provided to the client device in order to initiate a session. The client can parse the manifest file and request individual segments compliant to a delivery format (DF) using HTTP (or other protocols) and according to the information found in the manifest file. Consequently, in the present disclosure, the manifest file can be referred to as an MPD (Media Presentation Description) and the data model of this MPD is depicted in FIG. 2. The MPD can follow a data model comprising a sequence of one or more representations. A single representation can refer to a specific media having certain characteristics such as bitrate, resolution, or language. Furthermore, each representation may comprise one or more segments that describe the media content and/or metadata to decode and present the included media content.

The adaptation method (also referred to as adaptation logic) in such a system is generally located at the client side, which can be beneficial because the client knows its capabilities and bandwidth requirements best. However, this technique can also introduce same drawbacks. Current research (see references [1], [3], and [12]-[19], each of which is incorporated by reference herein in its entirety) is focused on one client device and how to properly adapt to this client device's needs to yield the best quality. New drawbacks may arise with increased deployment of adaptation methods such as DASH. For instance, mobile networks may be affected in the future because mobile data traffic may grow by a factor of 40 between 2009 and 2014 as recent studies seem to indicate (see reference [11], incorporated by reference herein in its entirety). Among mobile traffic, mobile video traffic may then account for approximately 66% of all mobile traffic.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

DESCRIPTION OF EXAMPLE EMBODIMENTS

Figure 1:
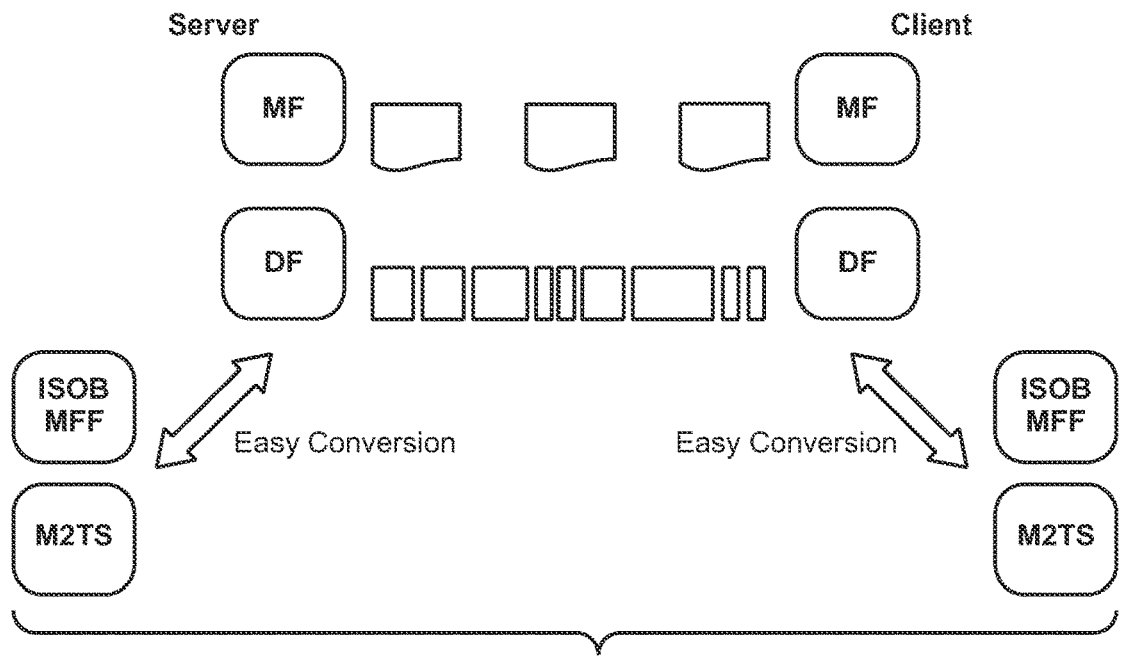
FIG. 1 depicts a basic representation of dynamic adaptive streaming over HTTP (DASH) protocol.

In an example embodiment of the invention, a quality level is selected from among a plurality of quality levels of media content adapted to be transferred, each quality level being representative of a media content version, each media content version comprising a first plurality of media content segments corresponding to time indices, wherein a second plurality of media content segments is associated with equal or varying quality levels and varying time indices and is adapted to be transferred to a client device with a buffer, further comprising: selecting a lowest quality level from among the plurality of quality levels if the buffer is not filled to a threshold level.

In an example embodiment of the invention, a quality level is selected from among a plurality of quality levels of media content adapted to be transferred, each quality level being representative of a media content version, each media content version comprising a first plurality of media content segments corresponding to time indices, wherein a second plurality of media content segments is associated with equal or varying quality levels and varying time indices and is adapted to be transferred to a client device with a buffer, further comprising: providing a quality level of a previously transferred media content segment; setting an intermediate quality level equal to a highest quality level supported by available data rate of a network link; and selecting the intermediate quality level if such level is below the quality level of the previously transferred media content segment.

In an example embodiment of the invention, adjustment of quality level of media content adapted to be transferred over a network link is controlled, the media content comprising a set of available media content versions, each available media content version being associated with a quality level, wherein a plurality of media content segments is adapted to be transferred, each media content segment being associated with equal or varying quality levels and varying time indices, further comprising: providing a first quality level representative of a previously transferred media content segment; providing a second quality level, wherein the second quality level is selected from among quality levels representative of the set of available media content versions; A) if the second quality level is less than the first quality level: setting a next quality level equal to the second quality level, the next quality level being representative of a next media content segment adapted to be transferred; and applying a backoff time to transferring of the media content such that quality level of the media content adapted to be transferred is prevented from increasing from the next quality level until the backoff time has passed; B) else if the second quality level is higher than the first quality level and the backoff time is less than or equal to zero: setting the next quality level equal to the second quality level.

In an example embodiment of the invention, adjustment of quality level of media content adapted to be transferred over a network link is controlled, the media content comprising a set of available media content versions, each available media content version being associated with a quality level, wherein a plurality of media content segments is adapted to be transferred, each media content segment being associated with equal or varying quality levels and varying time indices, further comprising: providing a first quality level representative of a previously transferred media content segment; providing a second quality level, wherein the second quality level is selected from among quality levels corresponding to the set of available media content versions; providing a counter variable; A) if the second quality level is less than the first quality level: setting a next quality level equal to the second quality level, the next quality level being representative of a next media content segment adapted to be transferred; B) else if the second quality level is higher than the first quality level and a backoff time is less than or equal to zero: determining whether or not the network link can support the second quality level, wherein the determining comprises a function of network architecture of the network link; a) if the network link can support the second quality level: setting the counter variable equal to zero; and setting the next quality level equal to the second quality level; b) else: applying the backoff time to transferring of the media content such that quality level of the media content adapted to be transferred is prevented from increasing from the next quality level until the backoff time has passed; and updating the counter variable; C) else: setting the next quality level equal to the first quality level.

In an example embodiment of the invention, adjustment of quality level of media content adapted to be transferred over a network link is controlled, the media content comprising a set of available media content versions, each available media content version being associated with a quality level, wherein a plurality of media content segments is adapted to be transferred, each media content segment being associated with equal or varying quality levels and varying time indices, and wherein a session of transferring media content is initiated by downloading a media presentation description or a manifest file, further comprising: providing a first quality level representative of a previously transferred media content segment; providing a second quality level, wherein the second quality level is selected from among quality levels corresponding to the set of available media content versions; A) if the second quality level is less than the first quality level: setting a next quality level equal to the second quality level, the next quality level being representative of a next media content segment adapted to be transferred; B) else if the second quality level is higher than the first quality level: determining a current client score based on average peak-signal-to-noise-ratio and maximum peak-signal-to-noise-ratio representative of all transferred media content segments starting from initiation of the session up until a time index corresponding to the next media content segment; determining a future client score based on the second quality level; a) if the future client score is greater than or equal to the current client score: determining whether or not the network link can support the second quality level, wherein the determining comprises a function of network architecture of the network link; i) if the network link can support the second quality level: setting the next quality level equal to the second quality level; C) else: setting the next quality level equal to the first quality level.

In an example embodiment of the invention, a network adapted to transfer media content is provided, comprising: one or more content-storage devices that are configured to store the media content, the media content comprising a set of available media content versions, each available media content version being associated with a quality level, wherein a plurality of media content segments is adapted to be transferred, each media content segment being associated with equal or varying quality levels and varying time indices; and one or more client devices that are configured to transfer the media content from the one or more content-storage devices over a network link, the one or more client devices being further configured to: store a first quality level representative of a media content segment previously transferred from the one or more content-storage devices to the one or more client devices; store a second quality level, wherein the second quality level is selected from among quality levels representative of the set of media content versions available from the one or more content-storage devices; A) if the second quality level is less than the first quality level: set a next quality level equal to the second quality level, the next quality level being represented of a next media content segment adapted to be transferred; and apply a backoff time to transferring of the media content such that quality level of the media content adapted to be transferred is prevented from increasing from the next quality level until the backoff time has passed; B) else if the second quality level is higher than the first quality level and the backoff time is less than or equal to zero: set the next quality level equal to the second quality level.

In an example embodiment of the invention, a network adapted to transfer media content is provided, comprising: one or more content-storage devices that are configured to store the media content, the media content comprising a set of available media content versions, each available media content version being associated with a quality level, wherein a plurality of media content segments is adapted to be transferred, each media content segment being associated with equal or varying quality levels and varying time indices; and one or more client devices that are configured to transfer the media content from the one or more content-storage devices over a network link, the one or more client devices being further configured to: store a first quality level representative of a media content segment previously transferred from the one or more content-storage devices to the one or more client devices; store a second quality level, wherein the second quality level is selected from among quality levels representative of the set of media content versions available from the one or more content-storage devices; store a counter variable; A) if the second quality level is less than the first quality level: set a next quality level equal to the second quality level, the next quality level being representative of a next media content segment adapted to be transferred; B) else if the second quality level is higher than the first quality level and a backoff time is less than or equal to zero: determine whether or not the network link can support the second quality level, wherein the determining comprises a function of network architecture of the network link; a) if the network link can support the second quality level: set the counter variable equal to zero; and set the next quality level equal to the second quality level; b) else: apply the backoff time to transferring of the media content such that quality level of the media content adapted to be transferred is prevented from increasing from the next quality level until the backoff time has passed; and update the counter variable; C) else: set the next quality level equal to the first quality level.

In an example embodiment of the invention, a network adapted to transfer media content is provided, comprising: one or more content-storage devices that are configured to store the media content, the media content comprising a set of available media content versions, each available media content version being associated with a quality level, wherein a plurality of media content segments is adapted to be transferred, each media content segment being associated with equal or varying quality levels and varying time indices; and one or more client devices that are configured to transfer the media content from the one or more content-storage devices over a network link, the one or more client devices being further configured to: store a first quality level representative of a media content segment previously transferred from the one or more content-storage devices to the one or more client devices; store a second quality level, wherein the second quality level is selected from among quality levels representative of the set of media content versions available from the one or more content-storage devices; A) if the second quality level is less than the first quality level: set a next quality level equal to the second quality level, the next quality level being representative of a next media content segment adapted to be transferred; B) else if the second quality level is higher than the first quality level: determine a current client score based on average peak-signal-to-noise-ratio and maximum peak-signal-to-noise-ratio representative of all transferred media content segments starting from initiation of the session up until a time index corresponding to the next media content segment; determine a future client score based on the second quality level; a) if the future client score is greater than or equal to the current client score: determine whether or not the network link can support the second quality level, wherein the determining comprises a function of network architecture of the network link; i) if the network link can support the second quality level: set the next quality level equal to the second quality level; C) else: set the next quality level equal to the first quality level.

As used herein, the term "network link" may refer to a connection between a client device (e.g., a mobile device, computer, tablet computer) and a source of media content (e.g., content-server, proxy). A proxy can be utilized as an intermediary between the client device and the content-server.

As used herein, the term "network architecture" may refer to specific configuration of content-servers, proxies, gateways, and client devices in a network link.

As used herein, the term "content-storage device" may refer to a device that can store media content either temporarily (e.g., a proxy) or long-term (e.g., a content-server).

As used herein, the term "proxy" may refer to a network element that stores content that has been previously selected by one or more client devices that are connected to the internet through this proxy. Internet service providers (ISP) and companies can use caching proxies to reduce downstream and upstream data rate usage and thus reduce cost. Distribution of content through the proxies depends on the client devices (e.g., location and/or available data rate of the client devices). Proxies generally cache a part of the content (e.g., some segments of a given bitrate, resolution, language, and so forth).

Figure 2:
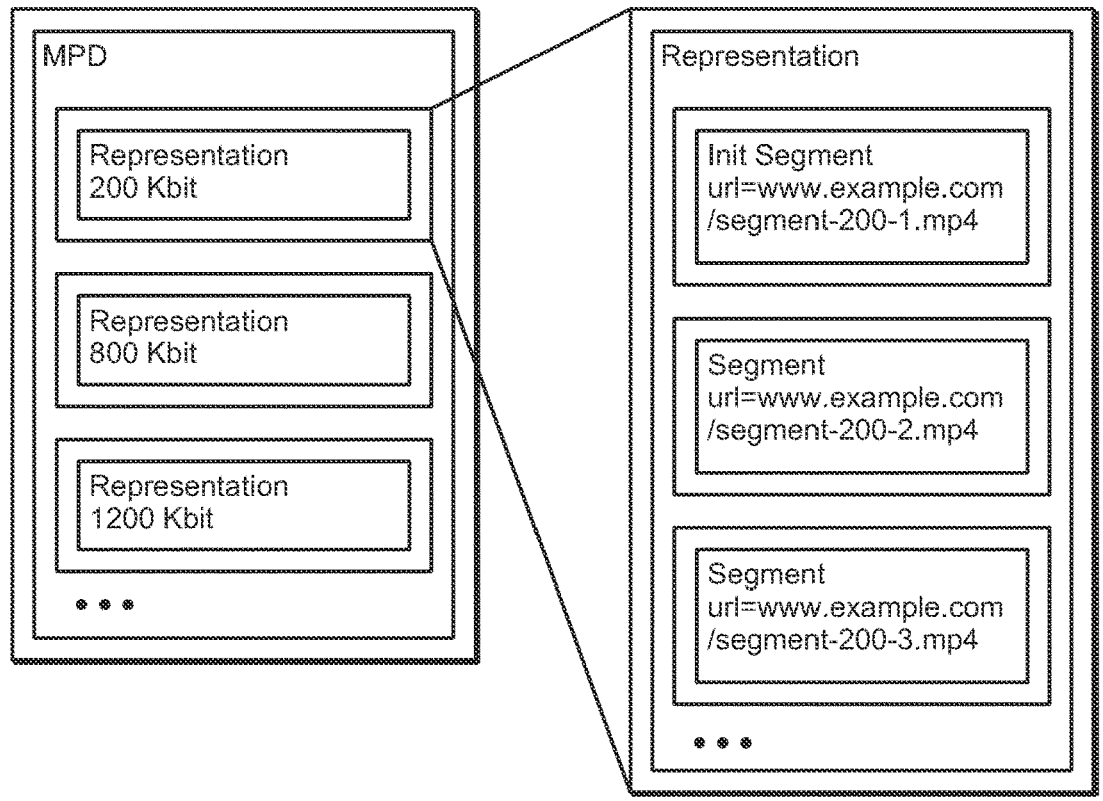
FIG. 2 depicts a data model of a media presentation description.

As used herein, the term "media presentation description" (MPD) may refer to a manifest file (MF) describing media content. FIG. 2 depicts a data model of an exemplary MPD that comprises a sequence of one or more representations. The MPD is provided by either a content-server or a proxy to a client device upon the client device's request in order to initiate a transferring session.

As used herein, the term "representation" may refer to a set of information referring to a portion of data which comprises specific media segments having certain characteristics. Characteristics of media segments include, by way of example and not of limitation, bitrate, resolution, camera angle, region of interest, presence of audio and quality of audio (if present), presence of video and quality of video (if present), codec (e.g., MPEG-2, AVC, MVC, SVC, and so forth), and language. Furthermore, each representation comprises one or more segments containing information that describes the media content and/or metadata to decode and present the media content referred to by the representation.

As used herein, the term "current time index" may refer to a time index corresponding to a media content segment currently being transferred or about to be transferred.

As used herein, the term "previously transferred segment" may refer to a segment of media content with a time index lower than the current time index, indicating media content which has already been transferred.

As used herein, the term "module" may refer to a unit that is configured to perform certain functions. Modules may be implemented in hardware, software, firmware, or combination thereof.

As used herein, the term "media content version" may refer to a version of media content comprising many segments and associated with a quality level. The quality level requires a certain amount of available data rate in order to be transferred.

As used herein, the term "non-cacheable object" may refer to an HTTP object where the "Cache-Control" feature is set to no-cache or another option that disables caching (see reference [1]).

As used herein, the term "quality" may refer to both objective image/video quality and subjective image/video quality. Objective image/video quality generally can be quantified. Examples of measures of (objective) image/video quality include distortion between an expected image and a predicted image, signal-to-noise ratio (SNR) of an image signal, peak signal-to-noise ratio (PSNR) of an image signal, and so forth.

Subjective image/video quality may refer to the quality of the image as seen by a viewer of the image/video. Although subjective image/video quality can also be measured using objective measures of image/video quality, an increase in objective image/video quality does not necessarily yield an increase in subjective image/video quality, and vice versa. In relation to images processed using block-based operations, for instance, subjective image/video quality considerations can involve determining how to process pixels along block boundaries such that perception of block artifacts are reduced in a final displayed image. To an observer of an image, subjective quality measurements are made based on evaluating features such as, but not limited to, smoothness, sharpness, details, and temporal continuity of various features in the image.

Quality may also refer to smoothness of media playback. For example, a media session where playback repeatedly halts and then resumes (jolting) would exhibit low quality whereas a media session without jolting would exhibit high quality.

As used herein, the term "quality level" may include, by way of example and not of limitation, metrics such as bitrate, resolution, codec, language, presence of audio and quality of audio (if present), and presence of video and quality of video (if present). By way of example and not of limitation, four different quality levels, each associated with an index, may be specified as follows:

Quality_level 1: only audio→bitrate=100 kbps
Quality_level 2: audio+low quality video→bitrate=500 kbps
Quality_level 3: audio+high quality video→bitrate=1000 kbps
Quality_level 4: audio+high quality video in high resolution→bitrate=2000 kbps In this example, note that quality levels whose indices differ by one would be referred to as being one step removed from each other. Generally, adjacent quality levels, which are those with indices that differ by one, differ in quality by a smallest step amount of change in quality. For example, quality levels 1 and 3 differ in quality by a smaller amount than a quality difference between quality levels 1 and 4. Allowed transitions between two quality levels can be set to be within a defined range at a given time instance. As one example, a condition can be set such that quality levels can only transition between quality levels associated with adjacent indices at a given time instance. As another example, a condition can be set such that quality levels can only transition between quality levels with a difference in index of three (or some other value) or less at a given time instance.

As used herein, the terms "bandwidth", "data capacity", and "available data rate" are used interchangeably and may refer to maximum rate of data throughput that a given link can carry.

As used herein, the phrase "supportable by the network link" may refer to capability of a network link to transfer media content at a given quality level for a duration of time spanning many media content segments without being forced to select a lower quality level.

As used herein, the term "streaming" may refer to transferring data, possibly followed by immediate playback.

As used herein, the term "transferring" may refer to moving data from one location to another (e.g., from content-server to a client device) and may include streaming. Transferring can also refer to chunk-based progressive downloading.

As used herein, the term "adaptation method" may refer to a method for selecting media content versions to be transferred based on available data rate of a network link.

As used herein, the term "defensive adaptation methods" may refer to those adaptation methods that do not react to short term throughput changes and where transitions between different representations are generally performed in a step-wise manner. Step-wise can refer to transitioning between different quality levels without skipping intermediate quality levels. For example, if three quality levels (e.g., 500 Kbps, 1000 Kbps, 1800 Kbps) are available, a step-wise transition may refer to a transition from 500 Kbps to 1000 Kbps (or vice versa) but not from 500 Kbps directly to 1800 Kbps (or vice versa).

As used herein, the term "aggressive adaptation methods" may refer to those adaptation methods that do the opposite of defensive adaptation methods. Aggressive adaptation methods may react to short term throughput changes and transitions made by the aggressive adaptation methods between different representations need not be step-wise.

It should be noted that while the present disclosure makes reference to bandwidth adaptation methods for transferring data over HTTP, the embodiments of the present disclosure can be utilized in other protocols. For example, the embodiments of the present disclosure can be utilized for protocols that utilize proxy caches with chunk-based dynamic streaming and where adaptation logic is located at the client side. Several embodiments of the present disclosure can be utilized to reduce adverse effects that may occur in a network system due to presence of a proxy between a content-server and a client device.

Two examples presented below depict problems of conventional DASH adaptation methods, which can impede optimal network performance. Both examples consider a scenario with multiple client devices transferring media content through a proxy, with media content available at differing quality levels depending on available data rate.

Figure 3:
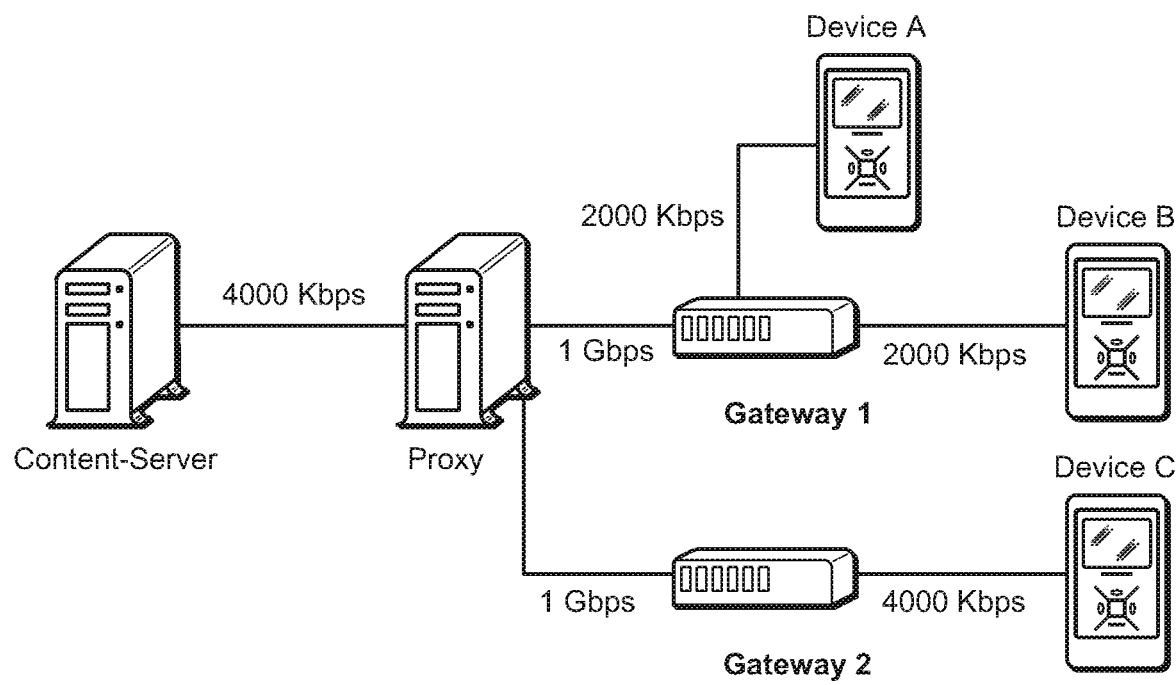
FIG. 3 depicts an example scenario where multiple devices are transferring media content.

In a scenario depicted in FIG. 3, Devices A and B are currently transferring media content through a live DASH session over a network. A network link between any two points (e.g., between a Content-Server and a client device such as Device A or B) is constrained by a link within the network link associated with a lowest available data rate (e.g., between a client device and a Gateway). Consider an MPD that contains representations describing different versions of the media content with bitrates of 500 Kbps (kilobits per second), 1000 Kbps, 1500 Kbps and 3500 Kbps. Further, consider that links between Devices A and B and Gateway 1 have a limited available data rate of 2000 Kbps. Links between Gateways 1 and 2 to a Proxy each have an available data rate of 1 Gbps (gigabits per second) and therefore do not limit overall network performance. Devices A and B are transferring a version of media content referred to by the 1500 Kbps representation (hereafter referred to as the 1500 Kbps media content version) because of their limited available data rate. The 1500 Kbps media content version will be cached on the Proxy.

Consider that Device C joins the network after Devices A and B have been transferring media content for some time. A link between the Content-Server and the Proxy can be (but need not be) split evenly if Gateways downstream from the Proxy are requesting different media content versions. For purposes of discussion, such link is assumed to split evenly between Gateways which are simultaneously requesting different media content versions. A link between Device C and Gateway 2 has an available data rate of 4000 Kbps. Defensive adaptation methods normally select the lowest available bitrate representation at the beginning of a session to fill a device's buffer. As a result, Device C will first begin transferring the 500 Kbps media content version and measure an available data rate of 2000 Kbps in Device C's link to the Content-Server because the link between the Content-Server and the Proxy has an available data rate of 4000 Kbps and such available data rate is shared between the Gateways 1 and 2. Such sharing occurs because a link between the Proxy and Gateway 1 is carrying a different media content version than a link between the Proxy and Gateway 2.

After Device C has measured an available data rate of 2000 Kbps, Device C will step up through the 1000 Kbps representation to the 1500 Kbps representation. The 1500 Kbps media content version is cached on the Proxy and does not need to be downloaded from the Content-Server. Therefore, Device C will measure an available data rate of 4000 Kbps and switch up to the 3500 Kbps representation. However, since the 3500 Kbps media content version is not cached on the Proxy, the 3500 Kbps media content version must be downloaded from the Content-Server. Device C will then measure an available data rate of 2000 Kbps (the 4000 Kbps link between Content-Server and Proxy is split equally between Gateways 1 and 2) and switch down to the 1500 Kbps representation. As a result, Device C will switch between downloading the 1500 Kbps and 3500 Kbps media content versions throughout the entire session.

Frequent switching between different media content versions can influence quality of experience (QoE). Transitions between quality levels associated with a larger difference in quality of media content version to be transferred can influence quality of experience more than transitions between quality levels associated with a smaller difference in quality of media content version to be transferred. For instance, transitions between 1000 Kbps and 3500 Kbps generally influence quality of experience more than transitions between 1000 Kbps and 1500 Kbps. Furthermore, video buffer of Device C may run out of frames during download of segments from the 3500 Kbps media content version, because the available data rate over the network link to Device C is insufficient for the 3500 Kbps media content version, which generally leads to a session that is not smooth and would thus be associated with a decrease in quality of experience (relative to a smooth session) at Device C.

Figure 4:
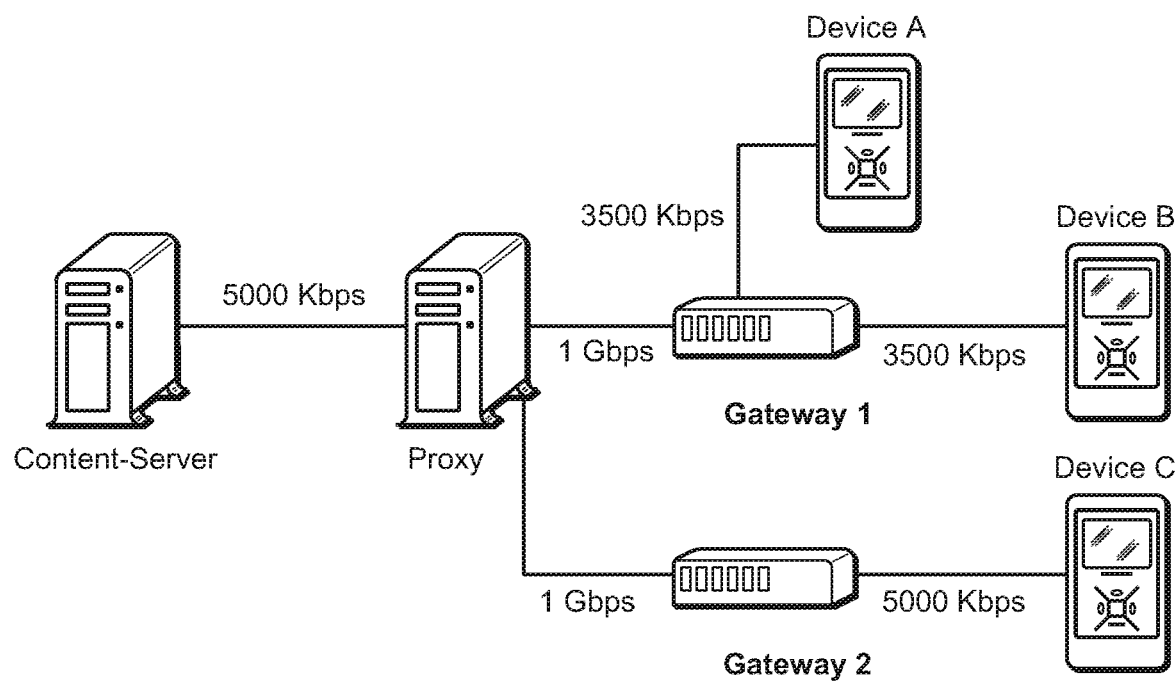
FIG. 4 depicts an additional example scenario where multiple devices are transferring media content.

A scenario depicted in FIG. 4 is similar to the scenario depicted in FIG. 3 with modified conditions and a different MPD. The MPD contains representations referring to media content versions with bitrates of 500 Kbps, 1000 Kbps, 2000 Kbps, 3000 Kbps, and 4000 Kbps. Links between Devices A and B to Gateway 1 have an available data rate of 3500 Kbps. Links between Gateways 1 and 2 to a Proxy each have an available data rate of 1 Gbps and therefore do not limit overall network performance. Devices A and B are transferring a live DASH session and have selected the 3000 Kbps representation due to their limited available data rate to the Proxy. Device C joins the network later, with a link to Gateway 2 having an available data rate of 5000 Kbps, and selects the 500 Kbps representation to fill its buffer as fast as possible. The link between the Proxy and the Content-Server will now be shared between Gateway 1 servicing Devices A and B and Gateway 2 servicing Device C.

Both Gateways would each be assigned 2500 Kbps of the link capacity of 5000 Kbps between the Content-Server and the Proxy if the link were shared equally. This means that Devices A and B can no longer transfer the 3000 Kbps media content version. Therefore, because of the new network conditions, Devices A and B switch down to a lower bitrate representation and corresponding media content version. This switch down generally results in both Devices A and B transferring the 2000 Kbps media content version, because this media content version is the best fit for the network conditions of these two devices, where the phrase "best fit for the network conditions" refers to selection of a highest quality media content version available that can be transferred at a data rate defined by network conditions. The length of time required for Devices A and B to arrive at a state where both are transferring the 2000 Kbps media content version depends on the adaptation method.

In the meantime, Device C will fill its buffer and switch up to the 2000 Kbps representation after some time dependent on adaptation method used by Device C. When Device C selects the 2000 Kbps representation, Device C will measure an available data rate of 5000 Kbps because the 2000 Kbps media content version should be cached on the Proxy (because of Devices A and B have already requested the 2000 Kbps media content version). After Device C selects the 2000 Kbps representation, the connection between the Proxy and the Content-Server will no longer be shared. This means that Device A and B will measure an available data rate of 3500 Kbps and Device C will measure an available data rate of 5000 Kbps because all three devices now transfer the same 2000 Kbps media content version stored on the Proxy.

Since Devices A and B measure an available data rate of 3500 Kbps, Devices A and B will then switch to the 3000 Kbps representation. Also, since Device C measures an available data rate of 5000 Kbps, Device C has two switch up options. Defensive adaptation methods would select the 3000 Kbps representation and aggressive adaptation methods would select the 4000 Kbps representation.

However, both options would end at the same representation. Specifically, after a period of time, Device C will select the 4000 Kbps representation regardless of whether defensive or aggressive adaptation methods were used. The defensive adaptation method would first select the 3000 Kbps representation and measure an available data rate of 5000 Kbps because the 3000 Kbps media content version is cached on the Proxy and all devices are currently transferring the 3000 Kbps media content version. Subsequently, Device C would select the 4000 Kbps representation and measure an available data rate of 2500 Kbps because the 4000 Kbps media content version is not cached on the Proxy. This switch-up decision by Device C will also affect Devices A and B because Devices A and B will now measure an available data rate of 2500 Kbps and the whole adaptation process starts again.

The above scenario shows that an adaptation decision by one client device (e.g., Device C) can adversely influence other client devices (e.g., Devices A and B). Device C will constantly switch between the 2000 Kbps, 3000 Kbps, and 4000 Kbps representations and eventually also exhaust its video buffer and produce a jolting session, which decreases QoE at Device C. In addition, Device C's adaptation decisions also influence Devices A and B. Specifically, both Devices A and B will switch between the 2000 Kbps and 3000 Kbps representations during the whole session and both could also exhaust their video buffers due to network condition changes introduced by Device C. Consequently, QoE of the three client devices will be reduced.

As demonstrated by the preceding two scenarios, bandwidth adaptation methods may only estimate available data rate from received packets directly and may not necessarily consider the network architecture (e.g., including content-server, proxy, gateways, and client devices). This may cause frequent representation (and corresponding media content version) switching and jolting playback at one device, which may degrade QoE as depicted in the preceding two scenarios. Moreover, due to the switching at this one device, other devices' sessions can be influenced, e.g., jolting playback and frequent representation (and corresponding media content version) switching, thus degrading QoE of these other devices in the network.

Proxy aware adaptation can address these issues and balance bandwidth sharing among peers. As previously described, some bandwidth adaptation methods may not consider uncontrolled media distribution through proxy caches. Therefore, these bandwidth adaptation methods may not take into account that bandwidth fluctuations can be caused by a client device's own unfavorable adaptation decisions. Bandwidth adaptation methods provided in this disclosure try to influence the adaptation process in a way that the previously described issues can be avoided. Proxy aware adaptation can be utilized to balance maximum overall quality and allow for smooth media playback with fewer representation changes in a given time period.

Table 1 defines some parameters for use in describing adaptation algorithms. In the disclosure, metrics, client score and system score, defined by average PSNR of a session and the variance of the PSNR, can be used as a measure of quality of the session.

TABLE 1

| Parameters | |
|---|---|
| $i \in [0, N]$ | segment index |
| $k \in [1, M]$ | device index |
| $\mu_i$ | average PSNR of segment i |
| $\mu_k$ | average PSNR at device k |
| f (i) | representation PSNR of the segment i, f(0) is equal to the PSNR at startup delay period |
| $t_i$ | length of segment i |
| $t_n$ | length of the session |

The average PSNR at the device k is defined as $\mu_k$:

$$\mu_{session} = \frac{1}{M}\sum_{k=1}^{M}\mu_k \quad (1)$$

The average PSNR of the session over all M devices is defined as $\mu_{session}$:

$$\mu_{session} = \frac{1}{M}\sum_{k=1}^{M}\mu_k \quad (2)$$

The variance of PSNR at the device k is defined as $\sigma_k^2$:

$$g(\mu_i) = \begin{cases} 1 & \text{if } i = 0 \\ 1 & \text{if } f(i) \neq f(i-1) \\ 0 & \text{others} \end{cases} \quad (3)$$

$$\sigma_k^2 = \frac{1}{I_n}\sum_{i=0}^{N}g(\mu_i)*(f(i)-\mu_k)^2$$

Standard deviation of the PSNR at the device k can be given by:

$$\sigma_k = \sqrt{\sigma_k^2}$$

The coefficient of variation at the device k is defined as $cv_k$:

$$cv_k = \frac{\sigma_k}{\mu_k}$$

where the coefficient of variation is a dimensionless number that can be used to compare sessions with different means.

The coefficient of variation at the session is defined as $cv_{session}$:

$$cv_{session} = \frac{1}{M}\sum_{k=1}^{M}cv_k \quad (4)$$

The client and system score are defined in (5) and (6), respectively:

$$\text{client\_score}_{bandwidth} = \frac{\mu_k}{PSNR_{max}*\alpha*e^{\beta*cv_k}} \quad (5)$$

$$\text{system\_score}_{bandwidth} = \frac{\mu_{session}}{PSNR_{max}*\alpha*e^{\beta*cv_{session}}} \quad (6)$$

where $PSNR_{max}$ is the maximum PSNR at the device over all segments that are being downloaded and $\alpha$ and $\beta$ are weighting factors utilized to adjust influence of variance since variance depends on human perception.

Different adaptation methods can be compared through computation of a client score or a system score when the adaptation methods under consideration are implemented. In general, an adaptation method associated with higher client and/or system scores may be considered to be a better method given network conditions. It is noted that Equations (5) and (6) comprise exemplary equations for computing the client score and system score, respectively, and need not be exponential functions. By way of example and not of limitation, client and system scores can be computed using linear functions or square functions.

In this disclosure, several embodiments of bandwidth adaptation algorithms are described.

An embodiment of an adaptation algorithm uses exponential backoff. This algorithm decreases number of switch up points if a switch down occurs. Specifically, the exponential backoff provides a wait time before a client device is allowed to switch up again after switching down. For each segment, a client device makes a decision regarding which quality level (e.g., bitrate, resolution, and so forth) should be chosen based on previously measured available data rate of the network link. If the client device detects that there is currently not enough available data rate on the network link for the representation that is being transferred, the client device will switch down to a representation that does not exceed the available data rate of the network link. This switch down decision will result in application of an exponential backoff to the client device. Therefore, the exponential backoff reduces frequent representation switching and thus may reduce negative influence on other sessions. This adaptation algorithm does not differentiate between external available data rate fluctuations due to the uncontrolled distribution of media through proxy caches and fluctuations caused by the client device.

The following algorithm provided below, corresponding to the algorithm described in the immediately preceding paragraphs, returns which available quality level (e.g., bitrate or resolution) should be used for the next segment, which, in turn, determines which representation should be selected from available representation options. Available representation options provide information describing available media content versions, each available media content version being associated with a quality level. Different media content versions may have the same quality level (e.g., bitrate or resolution), but differ in other characteristics (e.g., language). Different media content versions may also have higher or lower quality levels. For instance, other characteristics being equal, a media content version with a higher resolution is generally considered to be at a higher quality level than a media content version with a lower resolution.

Figure 5:
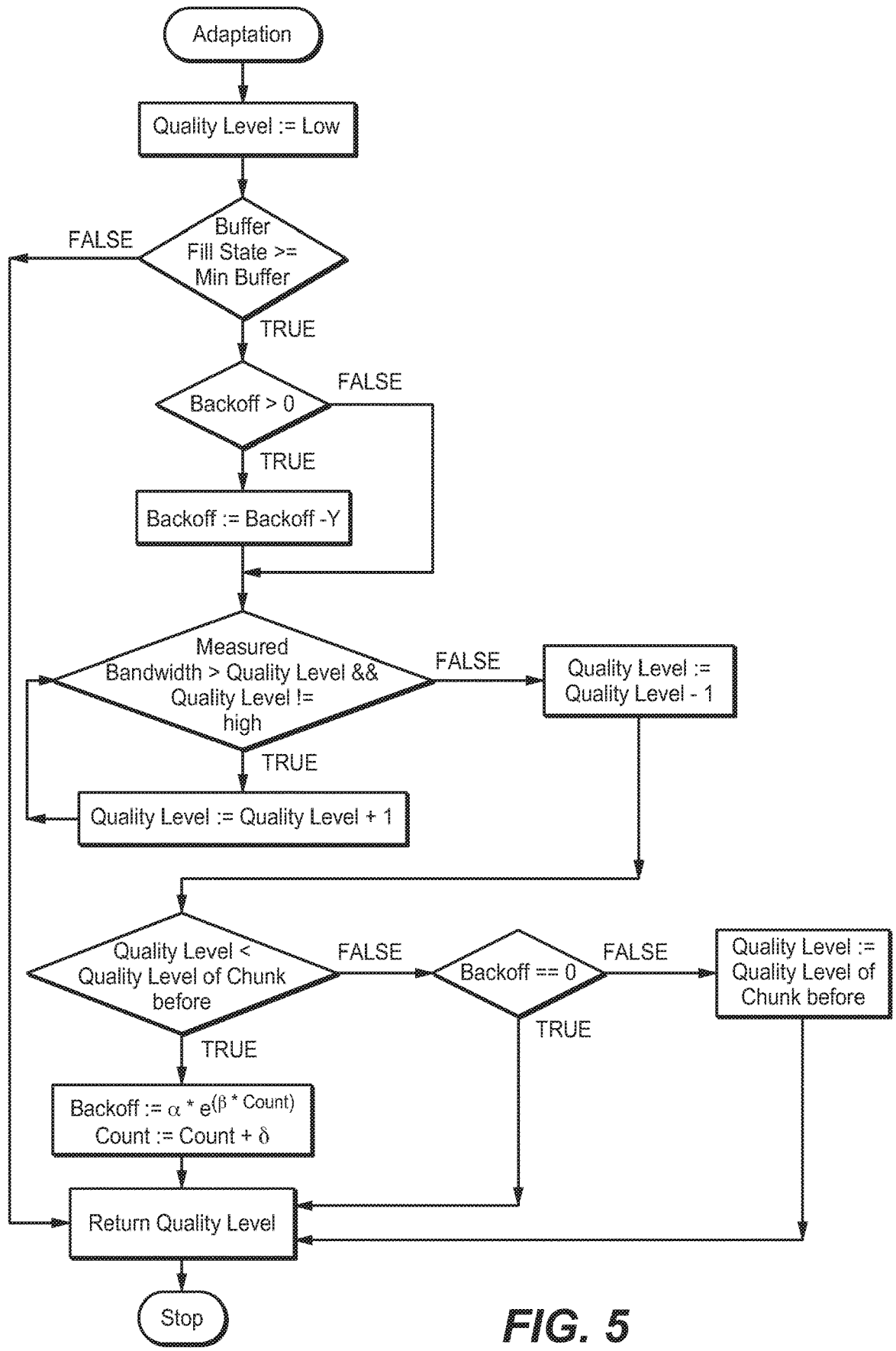
FIGS. 5-7 provide flowcharts that depict adaptation algorithms or methods.

The backoff function, which can be given by $\alpha e^{(\beta*count)}$ as discussed below, can be adjusted with parameters $\alpha$ and $\beta$ either in a linear manner or a nonlinear manner, respectively. Note that $\alpha$ and $\beta$ utilized in the backoff function are not the same as $\alpha$ and $\beta$ in Equations (5) and (6) for computing client and system scores. Additionally, parameters $\gamma$ and $\delta$ (also shown below) can be increased to accelerate or decelerate the adaptation process, respectively. By way of example and not of limitation, all four parameters may be set equal to 1. In general, selection of these four parameters will depend on network conditions. For mobile networks with high bandwidth fluctuations, for instance, $\beta$ can be set equal to 0. Note that this algorithm can utilize information pertaining to quality level of previously transferred media segments. Such information can be recorded for use in the algorithm. A flowchart corresponding to this algorithm is depicted in FIG. 5.

```
quality_level = low
if buffer_fill_state>=min_buffer
    if backoff> 0
        backoff = backoff - γ
    endif
    for current_quality_level = low to high do
        if current_quality_level<measured_bandwidth
            quality_level = current_quality_level
        endif
        current_quality_level++
    endfor
    if quality_level<quality_level_of_chunk_before
        backoff = α * e^(β * count)
        count = count + δ
        return quality_level
    elseif backoff<=0
        return quality_level
    endif
    quality_level = quality_level_of_chunk_before
endif
return quality_level
```

It should be noted that, based on the algorithm provided, exponential backoff can be cast as linear backoff. In the above pseudocode, if β is set equal to zero, then backoff is set by α (i.e., $\alpha e^{(\beta*count)}=\alpha$). Additionally, offsets may be used in computing backoff such that backoff can be provided by backoff=$\alpha*e^{(\beta*count+offset1)}$+offset2.

Aside from linear and exponential functions, other functions such as polynomial functions (e.g., square, cubic) can also be used for computing backoff. Selection of a function can depend on applications, network conditions, and network infrastructures. For instance, a network associated with fewer fluctuations in network conditions, where network conditions can comprise measured available data rate, may utilize a function that increases faster with increasing number of switch-downs (and vice versa for a network associated with more fluctuations in network conditions). Some network statistics may be amenable to an exponential backoff function. Incorporating parameters (e.g., offset1, offset2) and/or selecting different functions (e.g., linear, square) increase configurability of the backoff function.

An additional embodiment of the present disclosure uses exponential backoff in addition to a probe function, where the probe function can be used to determine if available data rate of a network link is sufficient for a given representation. In comparison to the first algorithm, a second adaptation algorithm utilizes a different technique to reduce bandwidth fluctuations caused by a client device switching representations.

As described in the first adaptation algorithm, bandwidth fluctuations can be introduced due to bandwidth adaptation methods that do not consider the uncontrolled distribution of media through proxy caches. The second adaptation algorithm uses a function referred to as probe to assist the client device in deciding whether or not to switch up to a representation requiring higher available data rate. This means that adaptation decisions that lead to a switch up can be double checked based on information from the probe function. Specifically, a determination is made as to whether or not sufficient available data rate exists on the network link for the purpose of transferring a representation under consideration suggested based on quality level of a previously transferred media segment.

An input to the probe function is the quality level that should be probed (e.g., a quality level associated with a segment from a given representation). The probe function returns a boolean value that indicates if enough available data rate exists for the given representation. Exemplary techniques are provided for making such a determination.

A first exemplary technique is that the server can provide a non-cacheable object. Therefore, available data rate of the network link to the server can be estimated, for instance, by dividing size of the non-cacheable object by time involved in completing transfer of the non-cacheable object. Furthermore, based on the estimation, an approximate determination can be made as to whether enough available data rate exists for a given representation.

A second exemplary technique is that the client device can download the first few bytes or a random byte range of a next segment of a media content version associated with a given representation and make an approximate determination as to whether there is enough available data rate for a given representation. Other estimation techniques of the available data rate can be used.

A third exemplary technique is that the proxy can modify the MPD and remove representations that cannot be used due to available data rate limitations of the network link. A carrier network may instruct a proxy specifically to modify the MPD so as to restrict representations made available to a client device. Such restrictions may be applied, for instance, to ensure bandwidth is available for additions to the network in the future. The client devices are informed if the available data rate of the network link changes. This can be done with an update interval element inside of the MPD (e.g., all the client devices have to update the MPD in a given interval). Such updating can assist the client device in periodically applying the latest changes to the MPD. For example, the MPD may be configured to instruct the client device to update (based on changes to the MPD made by the proxy) the client device's local copy of the MPD every few seconds such as every 2 seconds or 10 seconds. The third exemplary technique can be utilized alternative to or in conjunction with the probe function.

A fourth exemplary technique is that the proxy can offer a service that provides information about available data rate of the network link. Therefore, the client devices can request this service and gather information about the available data rate.

Figure 6:
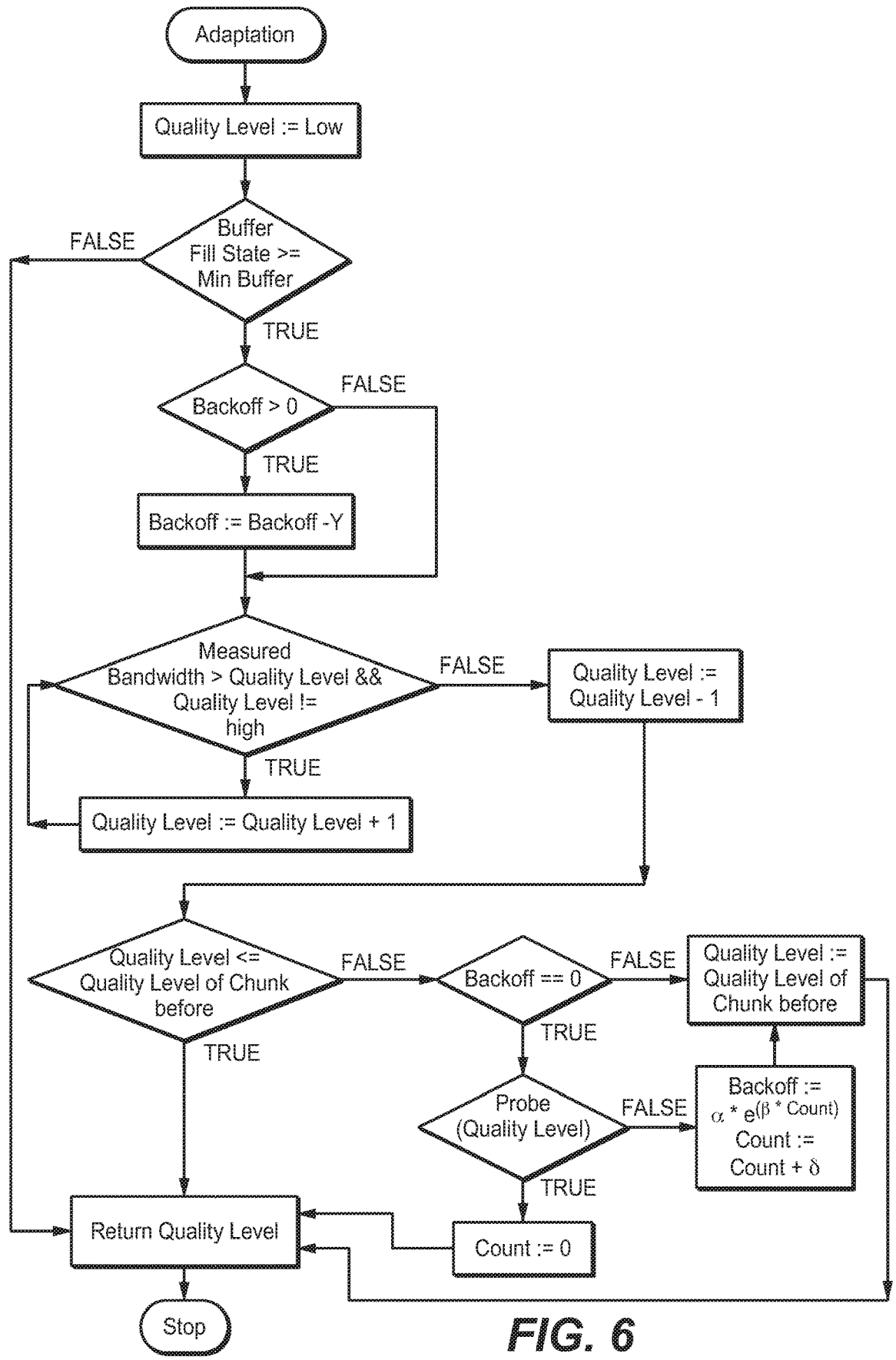

The first, second, and fourth exemplary techniques are examples of a client device initiated probe function, while third exemplary technique is an example of a proxy action which can yield results similar to a probe function. The following algorithm, corresponding to the adaptation method of the preceding paragraphs, uses the probe function to determine an appropriate quality level for downloading media. A flowchart corresponding to this algorithm is depicted in FIG. 6.

```
quality_level = low
if buffer_fill_state>=min_buffer
    if backoff>0
        backoff = backoff - γ
    endif
    for current_quality_level = low to high do
        if current_quality_level<measured_bandwidth
            quality_level = current_quality_level
        endif
        current_quality_level++
    endfor
    if quality_level<=quality_level_of_chunk_before
        return quality_level
    elseif backoff<=0
        if probe(quality_level)
            count = 0
            return quality_level
```

```
        else
            backoff = α * e^(β * count)
            count = count + δ
        endelse
    endif
    quality_level=quality_level_of_chunk_before
endif
return quality_level
```

A further embodiment of an adaptation method utilizes functions in conjunction with or alternative to exponential backoff. These functions are a calcCurrentScore function, which calculates a current client score based on the metric described in Equation (5), and a calcFutureEstimatedScore function, which will be described in the next paragraph.

The calcFutureEstimatedScore function is also based on the metric described in Equation (5). A difference between the calcFutureEstimatedScore function and the calcCurrentScore function is that the input values for the calcFutureEstimatedScore function, $\mu_k$ and $cv_k$, are estimated based on observed network conditions or the variance $\sigma_k^2$. Therefore, it is possible to identify switch up points which do not necessarily degrade network performance. For example, the client device can estimate how long the client device will be able to transfer a media content version associated with a given representation under consideration until a switch down occurs, where the given representation is selected in order to increase the client score as described in Equation (5). Based on estimation of time during which a selected media content version can be transferred given network available data rate limitations, it can be determined if a switch up decision under consideration will not necessarily degrade network performance.

Figure 7:
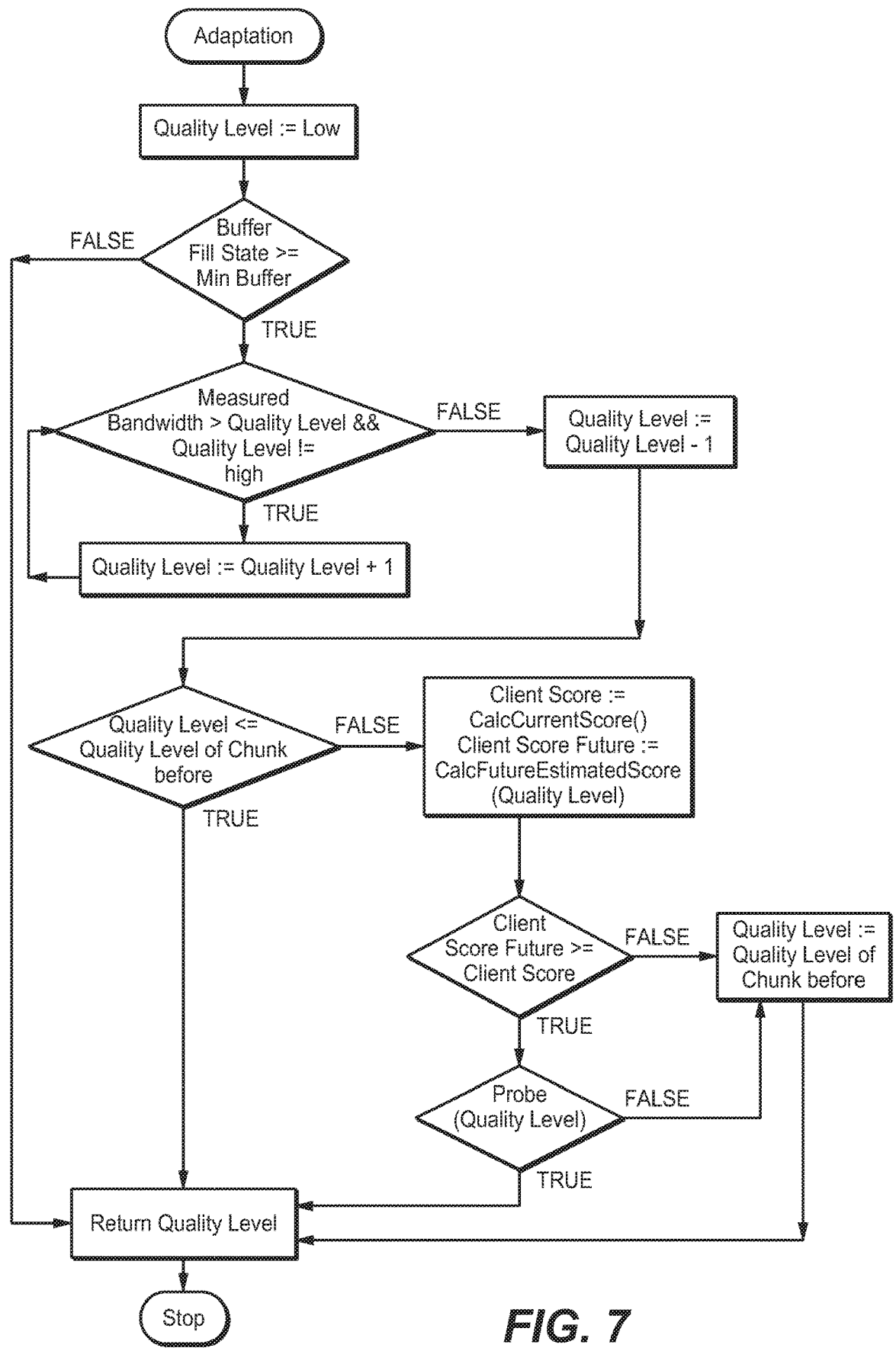

The following algorithm, in accordance with the adaptation method described in the preceding paragraphs, determines an appropriate quality level for transferring media content. A flowchart corresponding to this algorithm is depicted in FIG. 7.

```
quality_level = low
if buffer_fill_state>=min_buffer
    for current_quality_level = low to high do
        if current_quality_level<measured_bandwidth
            quality_level = current_quality_level
        endif
        current_quality_level++
    endfor
    if quality_level <= quality_level_of_chunk_before
        return quality_level
    else
        client_score = calcCurrentScore( )
        client_score_future = calcFutureEstimatedScore(quality_level)
        if client_score_future>= client_score
            if probe(quality_level)
                return quality_level
            endif
        endif
```

```
    endif
    quality_level = quality_level_of_chunk_before
endif
return quality_level
```

The examples set forth above are provided to give those of ordinary skill in the art a complete disclosure and description of how to make and use the embodiments of the bandwidth adaptation for dynamic adaptive transferring of multimedia of the disclosure, and are not intended to limit the scope of what the inventors regard as their disclosure. Modifications of the above-described modes for carrying out the disclosure can be used by persons of skill in the art, and are intended to be within the scope of the following claims.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a", "an", and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The methods and systems described in the present disclosure may be implemented in hardware, software, firmware or combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable gate array (FPGA)).

A number of embodiments of the disclosure have been described. Nevertheless, it will be understood that various modifications can be made without departing from the spirit and scope of the present disclosure. Accordingly, other embodiments are within the scope of the following claims.

Enumerated example embodiments ("EEEs") of the present invention have been described above. However, an embodiment of the present invention can relate to one or more of the examples, enumerated in Table 2 below.

TABLE 2

Enumerated Example Embodiments

1. A method for selecting a quality level from among a plurality of quality levels of media content adapted to be transferred, each quality level being representative of a media content version, TABLE 2-continued Enumerated Example Embodiments each media content version comprising a first plurality of media content segments corresponding to time indices, wherein a second plurality of media content segments is associated with equal or varying quality levels and varying time indices and is adapted to be transferred to a client device with a buffer, the method comprising:
selecting a lowest quality level from among the plurality of quality levels if the buffer is not filled to a threshold level.
2. A method for selecting a quality level from among a plurality of quality levels of media content adapted to be transferred, each quality level being representative of a media content version, each media content version comprising a first plurality of media content segments corresponding to time indices, wherein a second plurality of media content segments is associated with equal or varying quality levels and varying time indices and is adapted to be transferred to a client device with a buffer, the method comprising:
providing a quality level of a previously transferred media content segment;
setting an intermediate quality level equal to a highest quality level supported by available data rate of a network link; and
selecting the intermediate quality level if such level is below the quality level of the previously transferred media content segment.
3. A method for controlling adjustment of quality level of media content adapted to be transferred over a network link, the media content comprising a set of available media content versions, each available media content version being associated with a quality level, wherein a plurality of media content segments is adapted to be transferred, each media content segment being associated with equal or varying quality levels and varying time indices, the method comprising:
providing a first quality level representative of a previously transferred media content segment;
providing a second quality level, wherein the second quality level is selected from among quality levels representative of the set of available media content versions;
A) if the second quality level is less than the first quality level:
setting a next quality level equal to the second quality level, the next quality level being representative of a next media content segment adapted to be transferred; and
applying a backoff time to transferring of the media content such that quality level of the media content adapted to be transferred is prevented from increasing from the next quality level until the backoff time has passed;
B) else if the second quality level is higher than the first quality level and the backoff time is less than or equal to zero:
setting the next quality level equal to the second quality level.
4. The method of EEE Error! Reference source not found., wherein the backoff time is provided by a linear, polynomial, or exponential function of one or more scalar parameters.
5. The method of any one of EEEs Error! Reference source not found, or Error! Reference source not found., wherein the backoff time comprises a function of number of times, up until a time index $t_c$, that the second quality level has been less than the first quality level, wherein $t_c$ comprises a time index corresponding to the next media content segment adapted to be transferred.
6. The method of any one of EEEs Error! Reference source not found.-Error! Reference source not found., wherein the backoff time comprises an integer.
7. The method of any one of EEEs Error! Reference source not found.-Error! Reference source not found., further comprising updating the backoff time subsequent to transferring of the next media content segment.
8. The method of EEE Error! Reference source not found., wherein the updating the backoff time comprises:
providing a decrementing parameter γ;
if the backoff time is greater than zero:
subtracting the decrementing parameter γ from the backoff time; and
assigning a result of the subtracting to the backoff time.
9. The method of EEE Error! Reference source not found., wherein the decrementing parameter γ comprises a constant or a variable.
10. The method of any one of EEEs Error! Reference source not found.-Error! Reference source not found., further comprising, subsequent to the updating:
i) if the second quality level is greater than the first quality level and the backoff time is less than or equal to zero:
setting the next quality level equal to the second quality level;
ii) else:
setting the next quality level equal to the first quality level.
11. A method for controlling adjustment of quality level of media content adapted to be transferred over a network link, the media content comprising a set of available media content versions, each available media content version being associated with a quality level, wherein a plurality of media content segments is adapted to be transferred, each media content segment being associated with equal or varying quality levels and varying time indices, the method comprising:
providing a first quality level representative of a previously transferred media content segment;
providing a second quality level, wherein the second quality level is selected from among quality levels corresponding to the set of available media content versions;
providing a counter variable;
A) if the second quality level is less than the first quality level:
setting a next quality level equal to the second quality level, the next quality level being representative of a next media content segment adapted to be transferred;

TABLE 2-continued

Enumerated Example Embodiments

B) else if the second quality level is higher than the first quality level and a backoff time is less than or equal to zero:
determining whether or not the network link can support the second quality level, wherein the determining comprises a function of network architecture of the network link;
a) if the network link can support the second quality level:
setting the counter variable equal to zero; and
setting the next quality level equal to the second quality level;
b) else:
applying the backoff time to transferring of the media content such that quality level of the media content adapted to be transferred is prevented from increasing from the next quality level until the backoff time has passed; and
updating the counter variable;
C) else:
setting the next quality level equal to the first quality level.
12. The method of EEE Error! Reference source not found., wherein the updating the counter variable comprises incrementing the counter variable.
13. The method of any one of EEEs Error! Reference source not found, or Error! Reference source not found., wherein the updating the counter variable comprises adding a constant value to the counter variable.
14. The method of any one of EEEs Error! Reference source not found.-Error! Reference source not found., wherein the determining whether or not the network link can support the second quality level comprises:
transferring a non-cacheable object from a content-server to a client device of the network;
estimating available data rate based on the transferring; and
determining whether or not enough available date rate exists for transferring media content over the network link at the second quality level.
15. The method of EEE Error! Reference source not found., wherein the estimating comprises:
dividing amount of data transferred by time required for the transferring.
16. The method of any one of EEEs Error! Reference source not found.-Error! Reference source not found., wherein the determining whether or not the network link can support the second quality level comprises:
transferring to a client device a byte range from the next media content segment;
estimating available data rate based on the transferring; and
determining whether or not enough available date rate exists for transferring media content over the network link at the second quality level.
17. The method of EEE Error! Reference source not found., wherein the estimating comprises:
dividing amount of data transferred by time required for the transferring.
18. The method of any one of EEEs Error! Reference source not found.-Error! Reference source not found., wherein the determining whether or not the network link can support the second quality level comprises:
modifying a media presentation description or manifest file to remove representations corresponding to media content versions not supportable due to limitations in available data rate of the network link, wherein the modifying is performed by a proxy of the network link, and wherein the media presentation description or manifest file provides information describing the set of available media content versions,
wherein:
i) if a representation corresponding to the second quality level still exists in the media presentation description or manifest file subsequent to the modifying:
determining that the network link can support the second quality level;
ii) else:
determining that the network link cannot support the second quality level.
19. The method of any one of EEEs Error! Reference source not found.-Error! Reference source not found., wherein the determining is based on information about available data rate of the network link, the information being provided by a proxy of the network link.
20. The method of any one of EEEs Error! Reference source not found.-Error! Reference source not found., wherein the backoff time is provided by a linear, polynomial, or exponential function of one or more scalar parameters.
21. The method of any one of EEEs Error! Reference source not found.-Error! Reference source not found., wherein the backoff time comprises a function of the counter variable.
22. The method of any one of EEEs Error! Reference source not found.-Error! Reference source not found., wherein the backoff time comprises an integer.
23. The method of any one of EEEs Error! Reference source not found.-Error! Reference source not found., further comprising updating the backoff time subsequent to transferring of the next media content segment.
24. The method of EEE Error! Reference source not found., wherein the updating the backoff time comprises:
providing a decrementing parameter γ;
if the backoff time is greater than zero:
subtracting the decrementing parameter γ from the backoff time; and
assigning a result of the subtracting to the backoff time.
25. The method of EEE Error! Reference source not found., wherein the decrementing parameter γ comprises a constant or a variable.
26. A method for controlling adjustment of quality level of media content adapted to be transferred over a network link, the media content comprising a set of available media content versions, each available media content version being associated with a quality level, wherein a plurality TABLE 2-continued Enumerated Example Embodiments of media content segments is adapted to be transferred, each media content segment being
associated with equal or varying quality levels and varying time indices, and wherein a session
of transferring media content is initiated by downloading a media presentation description or
a manifest file, the method comprising:
providing a first quality level representative of a previously transferred media content segment;
providing a second quality level, wherein the second quality level is selected from among quality
levels corresponding to the set of available media content versions;
A) if the second quality level is less than the first quality level:
setting a next quality level equal to the second quality level, the next quality level being
representative of a next media content segment adapted to be transferred;
B) else if the second quality level is higher than the first quality level:
determining a current client score based on average peak-signal-to-noise-ratio and maximum peak-
signal-to-noise-ratio representative of all transferred media content segments starting from
initiation of the session up until a time index corresponding to the next media content segment;
determining a future client score based on the second quality level;
a) if the future client score is greater than or equal to the current client score:
determining whether or not the network link can support the second quality level, wherein the
determining comprises a function of network architecture of the network link;
i) if the network link can support the second quality level:
setting the next quality level equal to the second quality level;
C) else:
setting the next quality level equal to the first quality level.
27. The method of EEE 26, wherein the determining whether or not the network link can support
the second quality level comprises:
transferring a non-cacheable object from a content-server to a client device of the network;
estimating available data rate based on the transferring; and
determining whether or not enough available date rate exists for transferring media content over
the network link at the second quality level.
28. The method of EEE 27, wherein the estimating comprises:
dividing amount of data transferred by time required for the transferring.
29. The method of EEE 26, wherein the determining whether or not the network link can support
the second quality level comprises:
transferring to a client device a byte range from the next media content segment;
estimating available data rate based on the transferring; and
determining whether or not enough available date rate exists for transferring media content over
the network link at the second quality level.
30. The method of EEE 29, wherein the estimating comprises:
dividing amount of data transferred by time required for the transferring.
3E The method of EEE 26, wherein the determining whether or not the network link can support
the second quality level comprises:
modifying a media presentation description or manifest file to remove representations
corresponding to media content versions not supportable due to limitations in available data
rate of the network link, wherein the modifying is performed by a proxy of the network link,
wherein the media presentation description or manifest file provides information describing
the set of available media content versions,
wherein:
i) if a representation corresponding to the second quality level still exists in the presentation
description or manifest file subsequent to the modifying:
determining that the network link can support the second quality level;
ii) else:
determining that the network link cannot support the second quality level.
32. The method of EEE 26, wherein the determining is based on information about available data
rate of the network link, the information being provided by a proxy of the network link.
33. The method of any one of EEEs 3-32, wherein:
the second quality level is the highest quality level corresponding to measured available data rate
of the network link, wherein measurement of the available data rate assumes the media content
is adapted to be transferred directly from a content-server, and
the highest quality level is selected from among quality levels corresponding to the set of available
media content versions.
34. The method of any one of EEEs 3-33, wherein the plurality of quality levels is divided into
steps, each quality level being associated with an index, and wherein a difference between an
index associated with the second quality level and an index associated with the first quality
level is within a set range.
35. The method of any one of EEEs 3-33, wherein the plurality of quality levels is divided into
steps, each quality level being associated with an index, and wherein an index associated with
the second quality level differs from an index associated with the first quality level by one.
36. A network adapted to transfer media content, comprising:
one or more content-storage devices that are configured to store the media content, the media
content comprising a set of available media content versions, each available media content
version being associated with a quality level, wherein a plurality of media content segments is
adapted to be transferred, each media content segment being associated with equal or varying
quality levels and varying time indices; and
one or more client devices that are configured to transfer the media content from the one or more
content-storage devices over a network link, the one or more client devices being further
configured to:
store a first quality level representative of a media content segment previously transferred from
the one or more content-storage devices to the one or more client devices;

TABLE 2-continued

Enumerated Example Embodiments store a second quality level, wherein the second quality level is selected from among quality levels
representative of the set of media content versions available from the one or more content-
storage devices;
A) if the second quality level is less than the first quality level:
set a next quality level equal to the second quality level, the next quality level being represented
of a next media content segment adapted to be transferred; and
apply a backoff time to transferring of the media content such that quality level of the media
content adapted to be transferred is prevented from increasing from the next quality level until
the backoff time has passed;
B) else if the second quality level is higher than the first quality level and the backoff time is less
than or equal to zero:
set the next quality level equal to the second quality level.
37. A network adapted to transfer media content, comprising:
one or more content-storage devices that are configured to store the media content, the media
content comprising a set of available media content versions, each available media content
version being associated with a quality level, wherein a plurality of media content segments is
adapted to be transferred, each media content segment being associated with equal or varying
quality levels and varying time indices; and
one or more client devices that are configured to transfer the media content from the one or more
content-storage devices over a network link, the one or more client devices being further
configured to:
store a first quality level representative of a media content segment previously transferred from
the one or more content-storage devices to the one or more client devices;
store a second quality level, wherein the second quality level is selected from among quality levels
representative of the set of media content versions available from the one or more content-
storage devices;
store a counter variable;
A) if the second quality level is less than the first quality level:
set a next quality level equal to the second quality level, the next quality level being representative
of a next media content segment adapted to be transferred;
B) else if the second quality level is higher than the first quality level and a backoff time is less
than or equal to zero:
determine whether or not the network link can support the second quality level, wherein the
determining comprises a function of network architecture of the network link;
a) if the network link can support the second quality level:
set the counter variable equal to zero; and
set the next quality level equal to the second quality level;
b) else:
apply the backoff time to transferring of the media content such that quality level of the media
content adapted to be transferred is prevented from increasing from the next quality level until
the backoff time has passed; and
update the counter variable;
C) else:
set the next quality level equal to the first quality level.
38. A network adapted to transfer media content, comprising:
one or more content-storage devices that are configured to store the media content, the media
content comprising a set of available media content versions, each available media content
version being associated with a quality level, wherein a plurality of media content segments is
adapted to be transferred, each media content segment being associated with equal or varying
quality levels and varying time indices; and
one or more client devices that are configured to transfer the media content from the one or more
content-storage devices over a network link, the one or more client devices being further
configured to:
store a first quality level representative of a media content segment previously transferred from
the one or more content-storage devices to the one or more client devices;
store a second quality level, wherein the second quality level is selected from among quality levels
representative of the set of media content versions available from the one or more content-
storage devices;
A) if the second quality level is less than the first quality level:
set a next quality level equal to the second quality level, the next quality level being
representative of a next media content segment adapted to be transferred;
B) else if the second quality level is higher than the first quality level:
determine a current client score based on average peak-signal-to-noise-ratio and maximum peak-
signal-to-noise-ratio representative of all transferred media content segments starting from
initiation of the session up until a time index corresponding to the next media content segment;
determine a future client score based on the second quality level;
a) if the future client score is greater than or equal to the current client score:
determine whether or not the network link can support the second quality level, wherein the
determining comprises a function of network architecture of the network link;
i) if the network link can support the second quality level:
set the next quality level equal to the second quality level;
C) else:
set the next quality level equal to the first quality level.
39. A network adapted to transfer media content, comprising:
one or more content-storage devices that are configured to store the media content, the media
content comprising a set of available media content versions, each available media content TABLE 2-continued Enumerated Example Embodiments version being associated with a quality level, wherein a plurality of media content segments is adapted to be transferred, each media content segment being associated with equal or varying quality levels and varying time indices; and
one or more client devices that are configured to transfer the media content from the one or more content-storage devices over a network link, the one or more client devices being further configured to perform the method of any one of EEEs 1-35.

LIST OF REFERENCES

[1] C. Müller, C. Timmerer, "A Test-Bed for the Dynamic Adaptive Streaming over HTTP featuring Session Mobility", ACM Multimedia Systems, San Jose, Calif., USA, February 2011, pp. 271-276.
[2] Information technology-Dynamic adaptive streaming over HTTP (DASH)—Part1: Media presentation description and segment formats, ISO/IEC DIS 23009-1, August 2011.
[3] T. Stochhammer, "Dynamic Adaptive Streaming over HTTP—Standards and Design Principles", ACM Multimedia System conference, Feb. 23-25, 2011, San Jose, Calif., USA.
[4] ISO/IEC JTC1/SC29/WG11, "Text of ISO/IEC 14496-10:200X/FDAM 1 Multiview Video Coding", Doc. N9978, Hannover, Germany, July 2008.
[5] H. Schwarz, D. Marpe, T. Wiegland, "Overview of the scalable video coding extension of the H.264/AVC standard", IEEE Transactions on Circuits and Systems for Video Technology, vol 17, no. 9, September 2007, pp. 1103-1120.
[6] B. Wang, J. Kurose, P. Shenoy, D. Towsley, "Multimedia Streaming via TCP: An Analytic Performance Study", ACM Transactions on Multimedia Computing, Communications and Applications, vol. 4, no. 2, May 2008, pp. 16:1-16:22.
[7] 3GPP TS 26.234, "Transparent end-to-end packet switched streaming service (PSS)", Protocols and codecs, 2010.
[8] Microsoft Smooth Streaming, world wide website at iis.net/download/smoothstreaming (last retrieved: 14 Dec. 2011).
[9] Adobe HTTP Dynamic Streaming, world wide website at adobe.com/products/httpdynamicstreaming (last retrieved: 14 Dec. 2011).
[10] R. Pantos, W. May, "HTTP Live Streaming", IETF draft, September 2011, world wide website at tools.ietf.org/html/draft-pantos-http-live-streaming-07 (last retrieved: 14 Dec. 2011).
[11] Cisco White Paper: Cisco Visual Networking Index: Global Mobile Data Traffic Forecast Update, 2009-2014.
[12] T. Lohmar, T. Einarsson, P. Froejdh, F. Gabin, M. Kampmann, "Dynamic Adaptive HTTP Streaming of Live Content", IEEE International Symposium on a World of Wireless, Mobile and Multimedia Networks, June 2011.
[13] K. Evensen, D. Kaspar, C. Griwodz, P. Halvorsen, A. F. Hasen, P. Engelstad, "Improving the Performance of Quality-Adaptive Video Streaming over Multiple Heterogeneous Access Networks", ACM Multimedia Systems, San Jose, Calif., USA, February 2011.
[14] C. Liu, I. Bouazizi, M. Gabbouj, "Rate Adaptation for Adaptive HTTP Streaming", ACM Multimedia Systems, San Jose, Calif., USA, February 2011.
[15] R. Kuschnig, I. Kofler, H. Hellwagner, "An Evaluation of TCP-based Rate-Control Algorithms for Adaptive Internet Streaming of H.264/SVC", ACM Multimedia Systems, Scottsdale, Ariz., USA, February 2010.
[16] R. Kuschnig, I. Kofler, H. Hellwagner, "Evaluation of HTTP-based Request-Response Streams for Interent Video Streaming", ACM Multimedia Systems, San Jose, Calif., USA, February 2011.
[17] Y. Sanchez, T. Schierl, C. Hellge, T. Wiegland, D. Hong, D. De Vleeschauwer, W. Van Leekwijck, Y. Lelouedec, "iDASH: Improved Dynamic Adaptive Streaming over HTTP using Scalable Video Coding", ACM Multimedia Systems, San Jose, Calif., USA, February 2011.
[18] C. Timmerer, C. Mueller, "HTTP Streaming of MPEG Media", Proceedings of the Streaming Day 2010, Udine, Italy, September 2010.
[19] C. Mueller, C. Timmerer, "A VLC Media Player Plugin enabling Dynamic Adaptive Streaming over HTTP", ACM Multimedia, Scottsdale, Ariz., November 2011.

The invention claimed is:

1. A method for controlling adjustment of quality level of media content adapted to be transferred over a network link, comprising:
creating, at a server, an indication of availability for distribution to a plurality of client devices that lists content available from one or more content sources, the indication of availability comprising at least: a description of two or more first quality level segments of a particular media content item and a description of two or more second quality level segments of the particular media content item, wherein at least one or more first quality level segments of the two or more first quality level segments represent a same content portion of the particular media content item as at least one or more second quality level segments of the two or more second quality level segments, wherein the two or more first quality level segments of the particular media content item require a first data rate, wherein the two or more second quality level segments of the particular media content item require a second data rate, wherein the indication of availability includes an update interval element that informs the plurality of client devices when to update the indication of availability in a given interval;
causing the indication of availability to be sent to the plurality of client devices; and
wherein a client device among the plurality of client devices requests, from a content source of the one or more content sources selected from the indication of availability, a first segment from the two or more first quality segments of the particular media content item or from the two or more second quality segments of the particular media content item, to dynamically adapt to available bandwidth over the network link as periodically measured by the client device.

2. The method of claim 1, wherein prior to causing sending the indication of availability to a specific client device, the server modifies the indication of availability to remove one or more descriptions that cannot be used due to available data rate limitations of the network link.

3. The method of claim 1, wherein prior to causing sending the indication of availability to a specific client device, the server modifies the indication of availability to restrict descriptions made available to the specific client device.

4. The method of claim 1, wherein prior to causing sending the indication of availability to a specific client device, the server modifies the indication of availability to restrict descriptions made available to the specific client device to ensure bandwidth is available across the network link in the future.

5. The method of claim 1, wherein the indication of availability informs the plurality of client devices that available data rate of the network link has changed.

6. The method of claim 1, wherein the client device periodically measures available bandwidth over the network link.

7. One or more non-transitory computer-readable storage media, storing one or more sequences of instructions, which when executed by one or more processors cause performance of:
creating, at a server, an indication of availability for distribution to a plurality of client devices that lists content available from one or more content sources, the indication of availability comprising at least: a description of two or more first quality level segments of a particular media content item and a description of two or more second quality level segments of the particular media content item, wherein at least one or more first quality level segments of the two or more first quality level segments represent a same content portion of the particular media content item as at least one or more second quality level segments of the two or more second quality level segments, wherein the two or more first quality level segments of the particular media content item require a first data rate, wherein the two or more second quality level segments of the particular media content item require a second data rate, wherein the indication of availability includes an update interval element that informs the plurality of client devices when to update the indication of availability in a given interval;
causing the indication of availability to be sent to the plurality of client devices; and
wherein a client device among the plurality of client devices requests, from a content source of the one or more content sources selected from the indication of availability, a first segment from the two or more first quality segments of the particular media content item or from the two or more second quality segments of the particular media content item, to dynamically adapt to available bandwidth over the network link as periodically measured by the client device.

8. The one or more non-transitory computer-readable storage media of claim 7, wherein prior to causing sending the indication of availability to a specific client device, the server modifies the indication of availability to remove one or more descriptions that cannot be used due to available data rate limitations of the network link.

9. The one or more non-transitory computer-readable storage media of claim 7, wherein prior to causing sending the indication of availability to a specific client device, the server modifies the indication of availability to restrict descriptions made available to the specific client device.

10. The one or more non-transitory computer-readable storage media of claim 7, wherein prior to causing sending the indication of availability to a specific client device, the server modifies the indication of availability to restrict descriptions made available to the specific client device to ensure bandwidth is available across the network link in the future.

11. The one or more non-transitory computer-readable storage media of claim 7, wherein the indication of availability informs the plurality of client devices that available data rate of the network link has changed.

12. The one or more non-transitory computer-readable storage media of claim 7, wherein the client device periodically measures available bandwidth over the network link.

* * * * *